(12) United States Patent
Pearlman et al.

(10) Patent No.: US 6,750,943 B2
(45) Date of Patent: Jun. 15, 2004

(54) NOVELTY ITEM AND ASSOCIATED ENTERTAINMENT METHOD

(76) Inventors: Mark Pearlman, 525 E. 72nd 40 I, New York, NY (US) 10021; Gill Zalayet, Gronnegale 17A 1 TH, 7100 Vejle (DK); Erik Legernes, Gronnegale 17A 1 TH, 7100 Vejle (DK)

(*) Notice: Subject to any disclaimer, the term of this patent is extended or adjusted under 35 U.S.C. 154(b) by 57 days.

(21) Appl. No.: 10/160,301

(22) Filed: May 30, 2002

(65) Prior Publication Data

US 2003/0223041 A1 Dec. 4, 2003

(51) Int. Cl.7 .............................................. G03B 25/00
(52) U.S. Cl. ........................ 352/101; 215/395; 215/399
(58) Field of Search ..................... 352/101; 215/386, 215/395, 399

(56) References Cited

U.S. PATENT DOCUMENTS

| | | | | |
|---|---|---|---|---|
| 4,530,436 A | * | 7/1985 | Wiedmer | 215/246 |
| 5,037,087 A | * | 8/1991 | Roth | 482/93 |
| 5,364,274 A | * | 11/1994 | Sekiguchi | 434/365 |
| 5,482,163 A | * | 1/1996 | Hoffman | 206/534 |
| 5,586,665 A | * | 12/1996 | Brousseau | 211/59.2 |
| 5,880,811 A | * | 3/1999 | Parisi | 351/203 |
| 6,097,468 A | * | 8/2000 | Muehlenhard | 352/101 |
| 6,394,517 B1 | * | 5/2002 | Borg | 294/31.2 |

OTHER PUBLICATIONS

Zany Zoetrope, www.csiro.au/helix/experiments/dhexpzoetrope.html, Jul. 23, 1998.*

* cited by examiner

Primary Examiner—David M. Gray
(74) Attorney, Agent, or Firm—R. Neil Sudol; Henry D. Coleman; William J. Sapone

(57) ABSTRACT

An entertainment device which may be used as a promotional vehicle for the sale of beverage products includes a bottle having a sidewall and a vertical axis and a support member rotatably coupled to the bottle for enabling a rotation of the bottle about the axis. A series of closely related fixed images is disposed in a circular array on the sidewall for presenting a user with an apparently moving image during a rotation of the bottle about the axis.

19 Claims, 5 Drawing Sheets

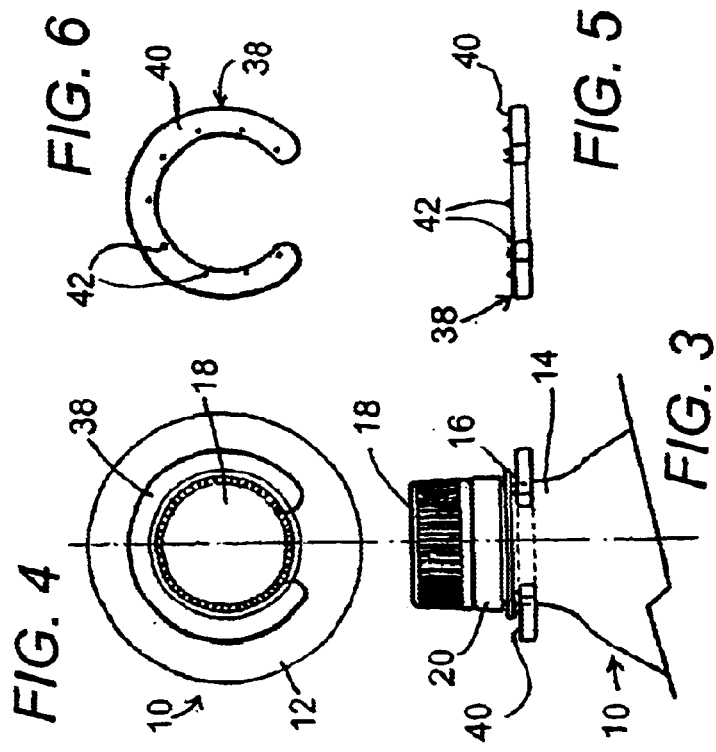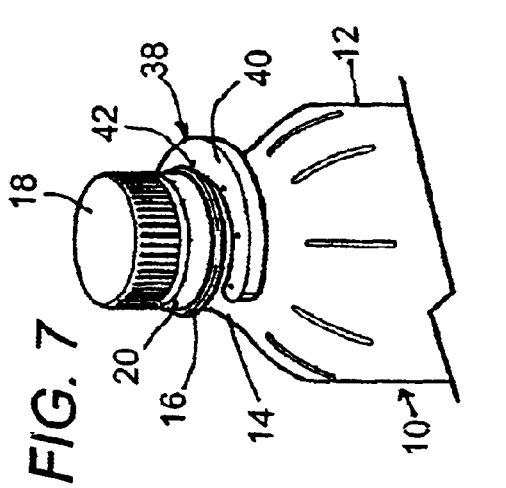

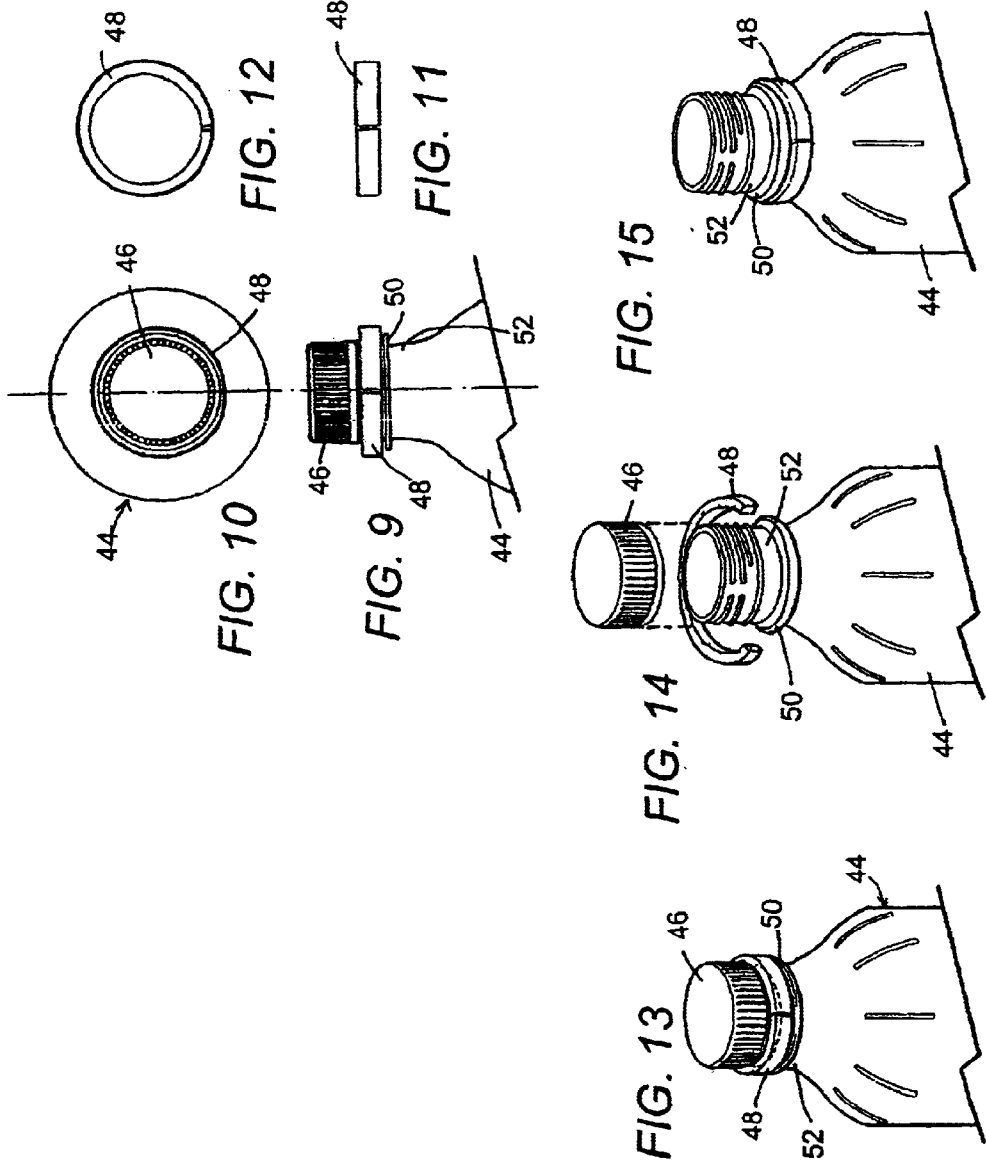

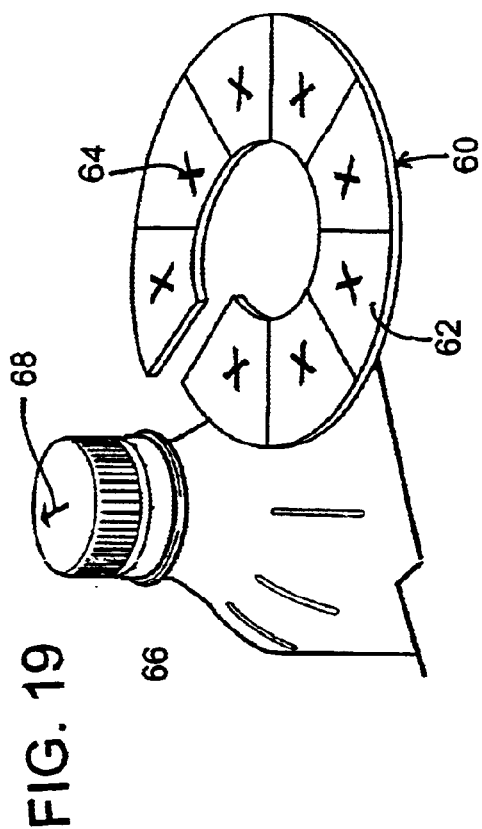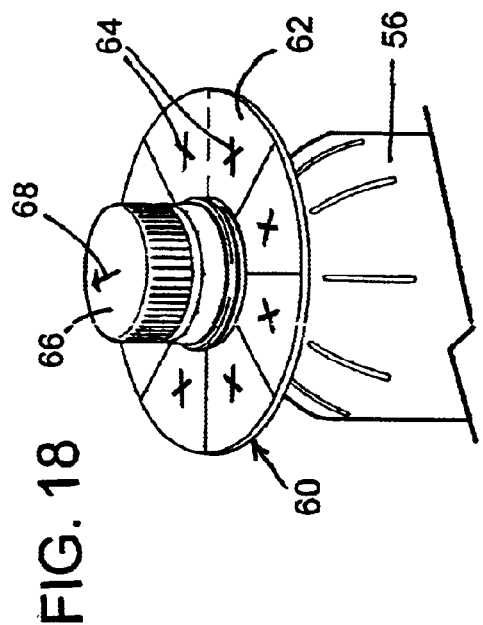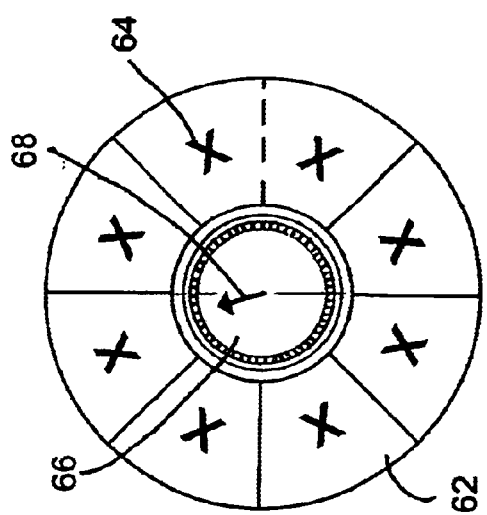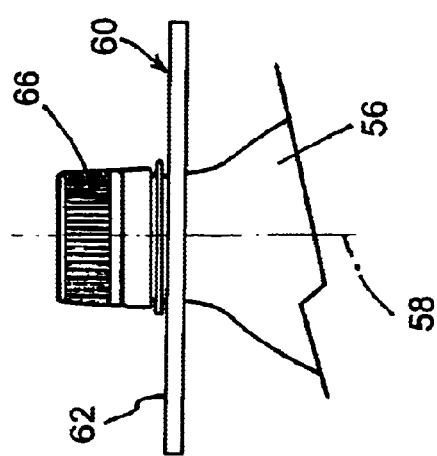
FIG. 19
FIG. 18
FIG. 17
FIG. 16

NOVELTY ITEM AND ASSOCIATED ENTERTAINMENT METHOD

BACKGROUND OF THE INVENTION

This invention relates to a novelty item or entertainment device. This invention also relates to an associated method of entertainment.

Products are frequently marketed with ancillary promotions. For instance, decades ago, food stores commonly sold products stamps, which were collected in books and redeemed for gifts. Similarly, airlines characteristically give points called "miles" to customers, the points generally being proportional to the miles traveled. Accumulated miles can be traded in for free trips or upgrades to higher classes. Fast food restaurants typically give away gifts with purchases made. These gifts are frequently graphical representations or figurines of characters from books and movies. Other food products such as carbonated beverages have been sold where each bottle or bottle cap is provided with a respective inscription from a predetermined set of images, graphical representations, or symbols. Prizes are awarded to those individuals who have acquired bottles or caps with one of a limited number of special symbols.

Promotional gifts or contests not only increase sales of the relevant product at the time of the promotion, but also serve to establish consumer brand loyalty and enhance goodwill and trademark recognition. Thus, promotions have beneficial long-term effects, which far outlast any particular game, contest, give-away, etc.

Promotions are especially effective when they are entertaining. The higher the entertainment value of a promotion, the longer consumer interest may be maintained in the promotion and the greater the increase in sales of the associated product or products.

OBJECTS OF THE INVENTION

A general object of the present invention is to provide an entertainment device and/or an associated method.

A more specific object of the present invention is to provide an entertainment device or associated method that may be used to promote sales of a certain kind of product.

Another object of the present invention is to provide such an entertainment device or method that can make use of the public's natural interest in motion pictures.

A further object of the present invention is to provide such an entertainment device or method that is easy to use.

Yet another object of the present invention is to provide such an entertainment device or method that is inexpensive.

These and other objects of the present invention will be apparent from the drawings and descriptions herein. Although every object of the invention is attained by at least one embodiment of the invention, there is not necessarily any embodiment of the invention in which all of the objects are achieved.

SUMMARY OF THE INVENTION

The present invention is broadly directed to a combination of a beverage bottle and an entertainment accessory connected to the bottle for cooperating therewith to perform an entertainment function. More specifically, the entertainment accessory and the bottle are movably connected to one another, with the entertainment effect arising because of the relative movement between the bottle and the entertainment accessory. In addition, the entertainment accessory may cofunction with other dedicated elements provided on the bottle to provide a source of entertainment.

One embodiment of the present invention is directed to an entertainment device and related method using an ordinary bottle, for example, a beverage bottle, to generate a zoetrope. The subject of the zoetrope is limitless. This entertainment device can be useful in marketing to generate interest in a bottle package, over and above the inherent interest in the contents of the bottle.

Accordingly, an entertainment device comprises, in accordance with the present invention, a bottle having a sidewall and a vertical axis, a support member rotatably coupled to the bottle for enabling a rotation of the bottle about the axis, and a series of closely related fixed images disposed in a circular array on the sidewall for presenting a user with an apparently moving image during a rotation of the bottle about the axis.

The support member is a holder manually graspable by the user for enabling the user to support and spin the bottle about the axis. The support member may be attached to the bottle at the time of manufacture. Preferably, however, the support member or holder is provided separately from the bottle and is attached to the bottle by the user, for instance, once the bottle is emptied of its consumable contents.

Pursuant to another feature of the present invention, the support member or holder is removably attached to the bottle. Thus, the user may uncouple the support member from the bottle and subsequently attach the same support member to a different bottle.

Where the bottle has a lower body portion and an upper neck portion, the support member or holder is coupled to the bottle about the neck. More specifically, the holder may take the form of a semi-rigid C-shaped bracket provided on at least one side with a series of spaced projections. The projections are nubs or beads, which engage a lower surface of a flange on the bottle neck and reduce the sliding friction between the holder and the flange.

Pursuant to another feature of the present invention, the fixed images are provided on a strip of film attached to the sidewall. The strip of film may be attached to an outer surface of the sidewall, with the fixed images facing inwardly into the bottle. In that case, the strip of film may be provided with a series of apertures spaced from one another in a plane oriented perpendicularly to the axis.

The strip of film may be a label for a product contained in the bottle. In that event, the strip of film is printed on an outer surface with product identification indicia.

An entertainment accessory comprises, in accordance with the present invention, a bracket with a generally C-shaped slot or opening for rotatably receiving a neck of a bottle. The bracket is provided along an upper side with means disposable in a low-friction engagement with an undersurface of a flange on the bottle neck for supporting the bottle to enable a rotating or spinning thereof by a user holding the bottle via the bracket. The bracket has a sufficient size to enable the user to grasp the bracket by hand.

In accordance with additional features of the present invention, the bracket is planar, while the means for supporting the bottle include a plurality of spaced projections, for example, beads, nubs, knobs, or bumps.

An entertainment method pursuant to the present invention utilizes a bottle having a series of closely related fixed images disposed in a circular array on a sidewall of the bottle. The method comprises spinning the bottle about a longitudinal or vertical axis and, during the spinning of the bottle, looking at a substantially fixed location in space along the sidewall to perceive an apparently moving image.

The spinning of the bottle may be accomplished by holding a bracket rotatably attached to the bottle. The bracket may be pre-attached to the bottle or, alternatively, attached to the bottle by the user. The bracket may be resilient clip fastened about a neck of the bottle.

An entertainment device in accordance with the present invention provides consumers with the possibility of viewing a mini film clip with each bottle of beverage purchased. Generally, it is contemplated that the user will spin the bottle and view the images only after the beverage product has been completely consumed. Where the images face inwardly into the center of the bottle and where the beverage product is opaque, it will be possible to view the images only after the bottle has been emptied of product to a level below that of the image strip.

The subject of the apparently moving image may draw from an endless store of existing imagery, as well as future imagery created for this purpose of licensed from other creators.

The entertainment device and method of the present invention create unique and personal items out of bottles, holders and film-strip type image arrays. The imagery may be selected to reinforce the public connection to a particular beverage product. For instance, a promotional contest will extend a prize to the consumer who find the odd film clip sequence. A novelty item in accordance with the invention will be more effective than images inside bottle caps for forming lasting emotional connections and strengthening brand association.

The entertainment device can be enjoyed repeatedly by the same person or by different people. In the latter case, the device presents the possibility of enhancing social interaction. It is possible to create a community of users and collectors.

The subject matter of the images may be characters or scenes from movies, films, and cartoons. The images may be pre-existing, in which case licenses may be necessary. Alternatively, new images may be acquired, for example, in the field of sports: NASCAR racing (driver completes final lap), surfing (ride wave to beach), snowboarding (execute flip), etc.

In a promotion using NASCAR racing, most of the image clips may show a lap sequence only, while a limited few will show a driver winning a race. In a promotion using characters and images from a movie such as "Harry Potter and the Philosopher's Stone," most of the image clips might show Harry Potter chasing the Golden Snitch in a game of Quiddich, while a restricted number might show Harry catching the Golden Snitch. A consumer who acquires a bottle having one of the limited image clips could be entitled to a prize such as a free bottle or free case of soda. Another promotion might use surfing clips, with the contest winners having clips of a surfer reaching a beach standing up. A holiday promotion might feature Santa Claus in his sleigh or taking items out of his gift bag. A clip of Santa Claus taking a bottle of a selected brand-name beverage product out of his bag could be the limited edition entitling the purchaser to a free gift.

BRIEF DESCRIPTION OF THE DRAWINGS

FIG. 2 is an elevational view of a strip of related graphical representations exemplarily used as part of the entertainment device or assembly of FIG. 1.

FIG. 3 is a partial side elevational view of a beverage bottle, showing a C-shaped support bracket or bottle holder in accordance with the present invention.

FIG. 4 is a top plan view of the bottle and support bracket of FIG. 3.

FIG. 5 is a side elevational view of the C-shaped support bracket of FIGS. 3 and 4.

FIG. 6 is a top plan view of the C-shaped support bracket of FIGS. 3–5.

FIG. 7 is a partial perspective view of the bottle and support bracket of FIGS. 3 and 4.

FIG. 8 is an exploded partial perspective view of the bottle and support bracket of FIGS. 3, 4 and 7, showing the bracket removed from a neck of the bottle.

FIG. 9 is a partial side elevational view of a beverage bottle, showing a removable support collar or bottle holder attached to a cap of the bottle, in accordance with the present invention.

FIG. 10 is a top plan view of the bottle and support collar of FIG. 9.

FIG. 11 is a side elevational view of the support collar of FIGS. 9 and 10.

FIG. 12 is a top plan view of the support collar of FIGS. 9–11.

FIG. 13 is a partial perspective view of the bottle and support collar of FIGS. 9 and 10.

FIG. 14 is an exploded partial perspective view of the bottle, cap, and support collar of FIGS. 9, 10 and 13, showing the collar in a deformed and expanded configuration allowing removal thereof removed from a neck of the bottle.

FIG. 15 is a partial perspective view similar to FIG. 13, showing the collar attached to the neck of the bottle below a neck flange thereof.

FIG. 16 is a partial side elevational view of a beverage bottle, showing an annular support bracket or bottle holder, which also provides a spinning-wheel-type game function, in accordance with the present invention.

FIG. 17 is a top plan view of the bottle and support bracket of FIG. 16.

FIG. 18 is a partial perspective view of the bottle and support bracket of FIGS. 16 and 17.

FIG. 19 is an exploded partial perspective view of the bottle and support bracket of FIGS. 16, 17 and 18, showing the bracket as a split ring removed from a neck of the bottle.

DETAILED DESCRIPTION OF THE PREFERRED EMBODIMENTS

Figure 1:
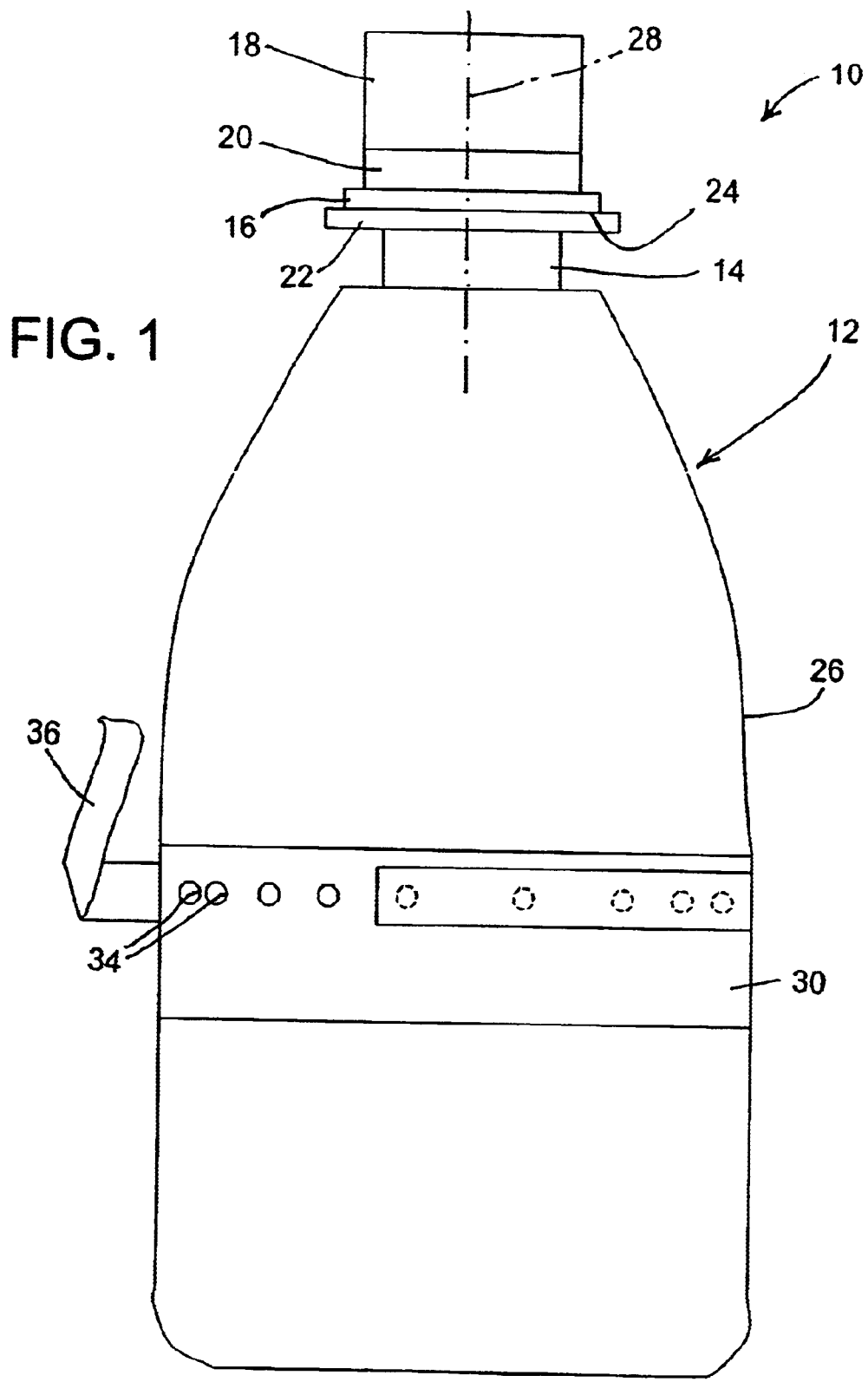
FIG. 1 is a schematic side elevational view of an entertainment device or assembly in accordance with the present invention.

FIG. 1 shows a beverage bottle 10 having a body 12, a neck 14, a flange 16 integral with the neck, a cap 18 with an associated disconnectable collar member 20, and a support or holder 22 disposed in a low-friction engagement with a lower surface 24 of flange 16. Body 12 includes a substantially vertical sidewall 26 and has a vertical axis 28 in a storage or rest orientation of the bottle 10. Support or holder 22 is rotatably coupled to neck 14 of bottle 10 for enabling a rotation of the bottle about axis 28.

Support or holder 22 is of a size or dimension so as to enable a user to manually grasp the support or holder with one hand while spinning the bottle about axis 28 with the other hand. Bottle 20 is suspended from support or holder 22 during a spinning of the bottle.

FIG. 2 shows a strip or film 30 bearing a series of closely related images 32 of a cartoon character. Adjacent images show the character 32 in slightly different positions or configurations. Strip or film 30 is attached to an inner or outer surface of sidewall 26 so that images 32 are disposed in a circular array. Preferably, strip 30 is attached to sidewall 26 with images 32 facing inwardly. Thus, where the beverage bottle is filled with an opaque liquid, the images 32 cannot be seen until the bottle 10 is emptied to a level at or below strip 30.

To view the images on strip 30 after a bottle has been sufficiently emptied, a user grasps support or holder 22 with one hand and rotates or spins the body 12 of bottle 10 about axis 28 with the other hand, while simultaneously focusing at least one eye on the strip or film 30. Where the images 32 on strip 30 face inwardly, the user must look through sidewall 26 to view the images. Because the bottle is spinning, the user is presented with an apparently moving image as one image 32 after another passes before his or her eye.

Strip or film 30 may be a label which is adhesively attached to bottle sidewall 28. In that case, an outer surface of strip 30 is provided with the usual identification indicia, including a trademark, product content information, contest rules, etc.

As illustrated in FIG. 1, strip/label 30 may be formed with a plurality of small openings 34 angularly equispaced about axis 28. Openings 34 are diametrically aligned with respective images 32 on the other side of bottle 10. Each successive image 32 is thus viewed through a different opening or hole 34. A removable band 36 may be adhesively attached to an outer surface of strip 30 or to a separate label (not separately shown) disposed over strip 30. Band 36 enables a continuity in the identification indicia printed on the outer side of strip or label 30. A consumer removes band 36 after purchasing bottle 10 and its beverage content, to facilitate a viewing of images 32 during a spinning of bottle 10.

Openings 34 and band 36 are optional. It is possible, for instance, for images 32 to be viewed from a point above or below strip or label 30. Apparent motion of images 32 will result merely by the user's focusing on a location opposite the viewing location. Alternatively, openings 34 may be replaced by slits (not shown) or crenellation-type notches (not shown) along an upper or lower edge of strip or label 30.

As illustrated in FIGS. 3–7, support or holder 22 may particularly take the form of a C-shaped bracket 38 made of a semi-rigid material. Bracket 38 is provided along an upper surface 40 with a plurality of spaced projections 42 in the form of beads or nubs. Projections 42 are engageable with lower surface 24 of flange 16 so that the flange rides in a low-friction contact on support bracket 38.

Support bracket 38 may be attached to bottle 10 at the time of manufacture, for instance via adhesive or adhesive tape. If support bracket 38 is provided separately from bottle 10, the bracket is attached to bottle neck 14 by the user before or after the bottle is emptied of its consumable contents. To that end, support bracket 38 has sufficient resilience to expand and subsequently contract during a pushing of the bracket onto neck 14. The same resilience or flexibility will enable a user to both pull support bracket 38 off one bottle 10 and to reattach the bracket to another bottle.

As illustrated in FIGS. 9–13, a beverage bottle 44 is provided with a cap 46 connected at a lower end to a split ring or collar 48. Ring 48 is thus located above a flange 50 on a neck 52 of bottle 44 and preferably, but not necessarily, has an inherent spring bias tending to return the ring to an annular or circular configuration. Upon a removal of cap 46 via a customary twisting motion, ring 48 is expanded to enable a separation of the ring from bottle neck 52, as shown in FIG. 14. Subsequently, as depicted in FIG. 15, ring 48 is snapped back onto bottle neck 52, at a position below flange 50. Ring 48 is then used as described above to generate a zoetrope-type entertainment. Ring may be provided with friction-reducing beads or nubs as described above with reference to projections 42.

As depicted in FIGS. 16–19, a support for enabling a user to hold a bottle 56 for rotation about an axis 58 may particularly take the form of a split-ring bracket or collar 60 made of a semi-rigid material such as cardboard. Split ring 60 is provided along an upper surface 62 with a plurality of angularly spaced symbols 64 that may be used in a spin-the-wheel type game. Symbols 64 may be alphanumeric messages, logos, graphical representations, or other kinds of signs having a meaning or significance. To that end, a bottle cap 66 may be provided with a marker 68 to define which of the symbols 64 is to be selected upon each spin of bottle 56. By way of example, symbols 64 may be answers to yes-no type questions: "Most definitely," "Possibly," "No way," "Forget it," "If you're lucky," etc. In another example, symbols or graphical representations 64 may identify types of consumer goods or property: a sports car, a speed boat, a personal helicopter, a house, etc. In a further example, symbols 64 are astrological signs. In yet another example, symbols or graphical representations 64 may be faces with identifiable expressions: happy, sad, grouchy, shy, puzzled, etc.

Figure 20:
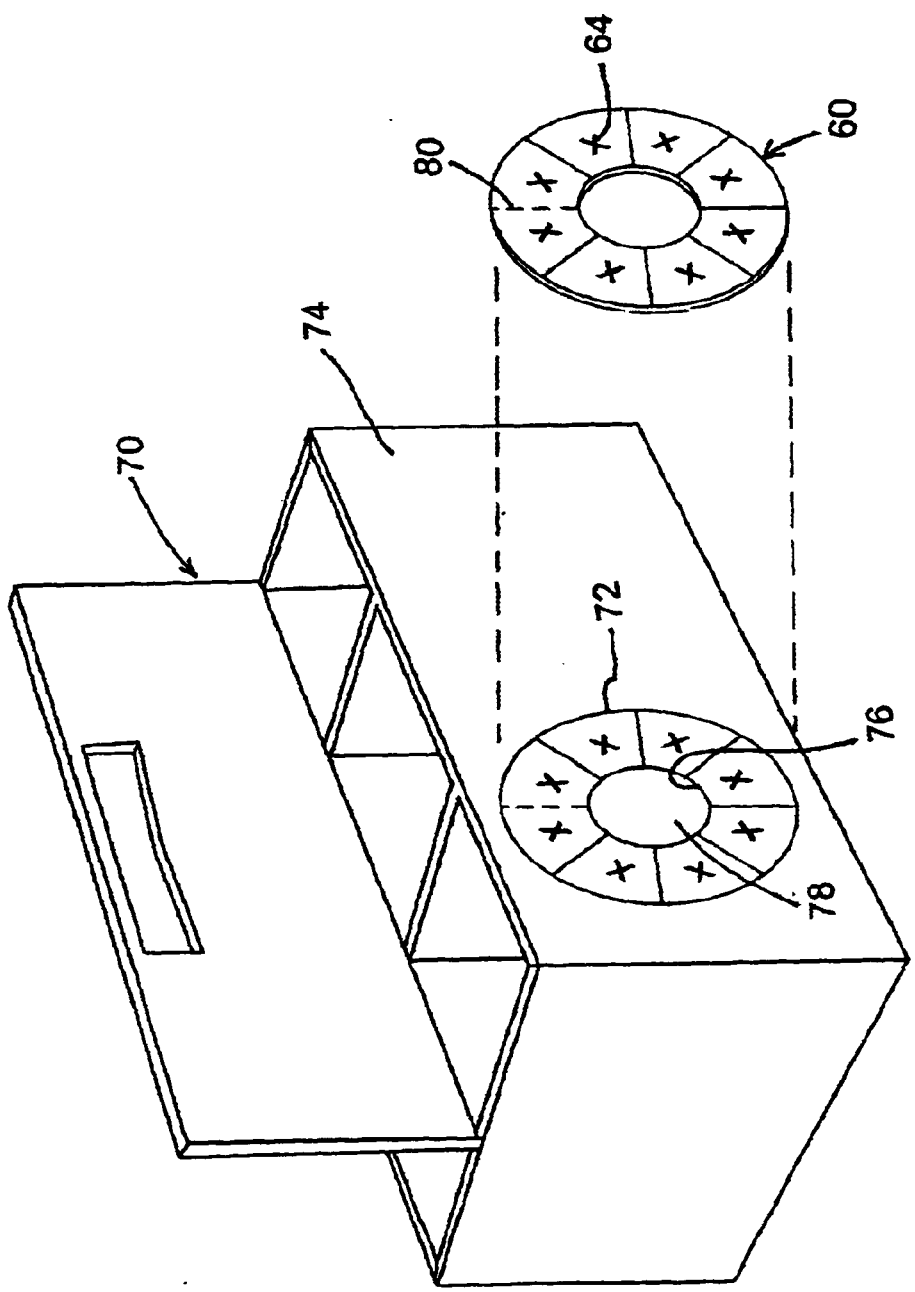
FIG. 20 is an exploded partial perspective view showing the split-ring bottle support as a removable section of a bottle carton.

As shown in FIG. 20, split ring 60 may be a separable part of a bottle carton 70. An outer edge 72 of ring 60 may be connected to a main panel 74 of carton 70 via a perforated score line (not separated designated). Similarly, an inner edge 76 of ring 60 is optionally connected to a circular center 78 via a respective perforated score line (not separately designated). A slit 80 in ring 60 may be defined also in carton 70 as a perforated line (not separately designated). In an alternative mode of manufacture, transport and use, ring 60 may be a separate member removably attached to panel 74 via an adhesive.

Although the invention has been described in terms of particular embodiments and applications, one of ordinary skill in the art, in light of this teaching, can generate additional embodiments and modifications without departing from the spirit of or exceeding the scope of the claimed invention. For example, the support member or holder 22 may assume a number of alternative forms, in addition to C-shaped clip or bracket 38 and split ring or collar 48. Possible alternatives include a handle connected by one or more clips to the neck flange of a bottle. The handle may take the form of a loop or hook, while the clips are provided with grooves traversed by the neck flange. The bottle is suspended from the loop or hook as it is held above the bottle.

In another alternative, the support or holder is a platform with ball or roller bearings. The bottle sits on the platform, which in turn is supported in the hand or on a table or counter top.

Accordingly, the drawings and descriptions herein are proffered to facilitate comprehension of the invention and not to limit or circumscribe the scope thereof.

What is claimed is:

1. An entertainment device comprising:
   a bottle having a sidewall defining a first diameter and a vertical axis, said bottle including a neck of substantially smaller diameter than said first diameter;
   a substantially rigid support member different from a user's hand, said support member being rotatably coupled to said bottle for enabling a rotation of said bottle about said axis and relative to said support member; and
   a series of closely related fixed images disposed in spaced non-overlapping relation in a circular array on said sidewall for presenting a user with an apparently moving image during a rotation of said bottle about said axis.

2. The entertainment device defined in claim 1 wherein said support member is a holder manually graspable by the user for enabling the user to support and spin said bottle about said axis.

3. The entertainment device defined in claim 2 wherein said holder is removably coupled to said bottle.

4. The entertainment device defined in claim 3 wherein said holder is coupled to said bottle about said neck.

5. The entertainment device defined in claim 4 wherein said bolder is taken from the group consisting of a semi-rigid C-shaped bracket and a split ring.

6. The entertainment device defined in claim 5 wherein said holder is provided on at least one side with a series of spaced projections, said bottle having a flange at an upper end of said neck, said projections being disposed in a low-friction engagement with a lower surface of said flange.

7. The entertainment device defined in claim 6 wherein said bottle is a beverage bottle provided with a cap and a collar located above said flange.

8. The entertainment device defined in claim 5 wherein said split ring is separated from a cap of said bottle.

9. The entertainment device defined in claim 5 wherein said split ring is separated from a bottle carton.

10. The entertainment device defined in claim 1 wherein said fixed images are provided on a strip of film attached to said sidewall.

11. The entertainment device defined in claim 10 wherein said wherein said strip of film is attached to an outer surface of said sidewall.

12. The entertainment device defined in claim 11 wherein said fixed images face inwardly into said bottle.

13. The entertainment device defined an claim 12 wherein said strip of film is provided with a series of apertures spaced from one another in a plane oriented perpendicularly to said axis.

14. The entertainment device defined in claim 12 wherein said strip of film is a label for a product contained in said bottle, said strip of film being provided on an outer surface with product identification indicia.

15. The entertainment device defined in claim 1 wherein said support is provided with a plurality of angularly spaced upwardly facing symbols.

16. A bottle assembly comprising:
    a bottle body;
    a bottle neck integral with said body;
    a cap removably attached to said neck on a side thereof opposite said body; and
    a split ring collar encircling said neck and removably connected to said bottle body, said collar having a flat configuration with a width dimension extending in a plane perpendicular to said neck and a thickness dimension extending in a direction parallel to an axis of said body and said neck, said width dimension being substantially larger than said thickness dimension, so that said collar takes the form of a disk-shaped collar.

17. The bottle assembly of claim 16 wherein said split ring collar is provided with a plurality of angularly spaced symbols.

18. The bottle assembly of claim 17 wherein at least one of said bottle body and said cap is provided with a visual marker alignable alternately with different ones of said symbols.

19. An entertainment method comprising:
    providing a bottle having a series of closely related fixed images disposed in a circular array on a sidewall of said bottle, said sidewall defining a first diameter, said bottle including a neck of substantially smaller diameter than said first diameter;
    spinning said bottle about a longitudinal axis, the spinning of said bottle including holding a bracket rotatably attached to the neck of said bottle; and
    during the spinning of said bottle, looking at a substantially fixed location in space along said sidewall to perceive an apparently moving image.

* * * * *